Aug. 17, 1943.  E. B. CUSHMAN  2,327,021
CABLE TENSION REGULATOR
Filed Oct. 21, 1941  2 Sheets-Sheet 1
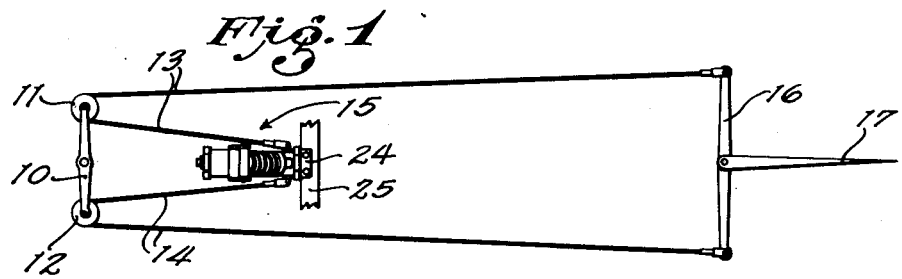
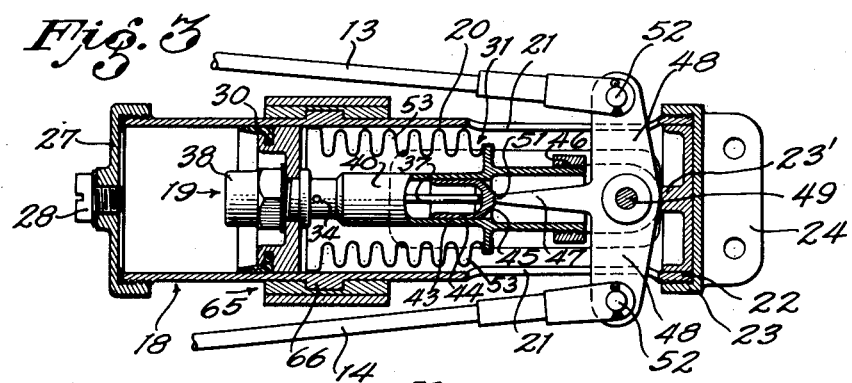
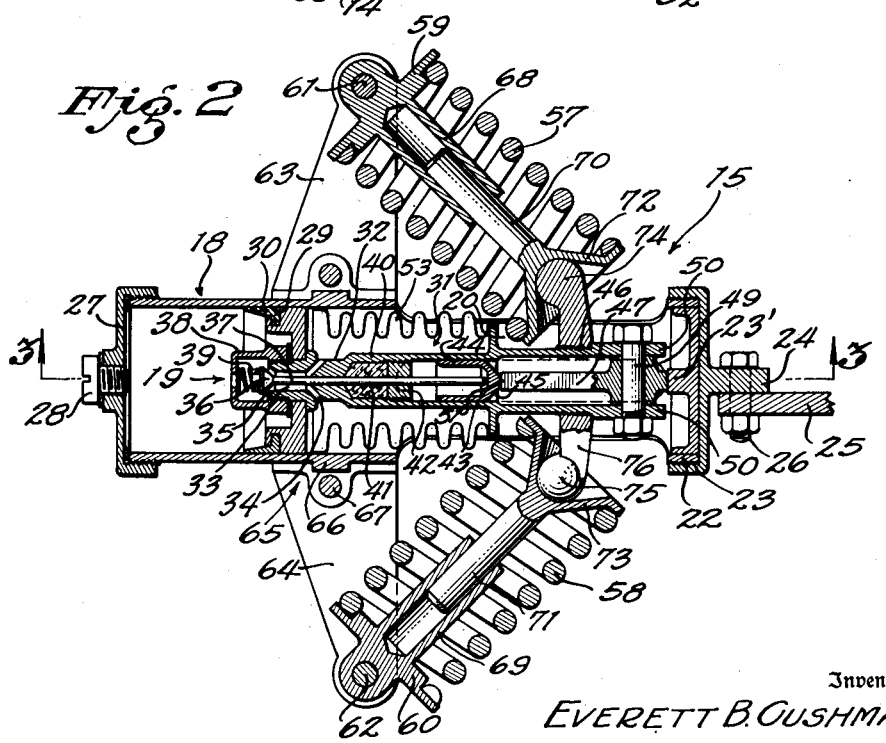
Inventor,
EVERETT B. CUSHMAN
By James M. Abbott
Attorney Aug. 17, 1943.    E. B. CUSHMAN    2,327,021
CABLE TENSION REGULATOR
Filed Oct. 21, 1941    2 Sheets-Sheet 2
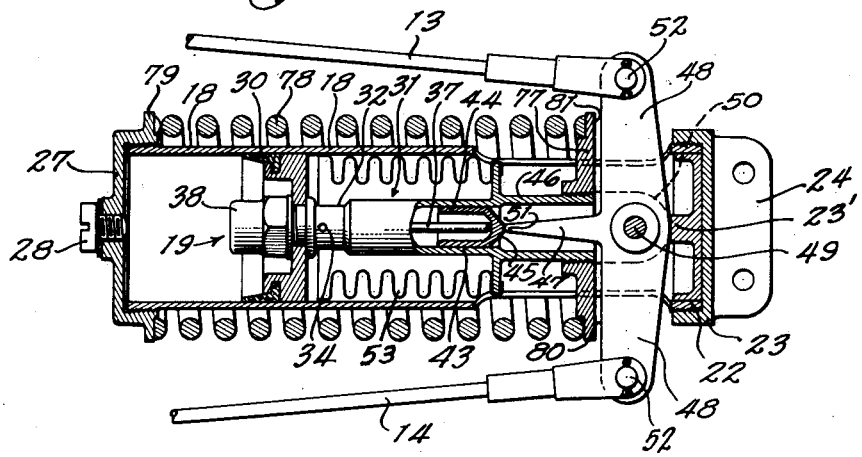
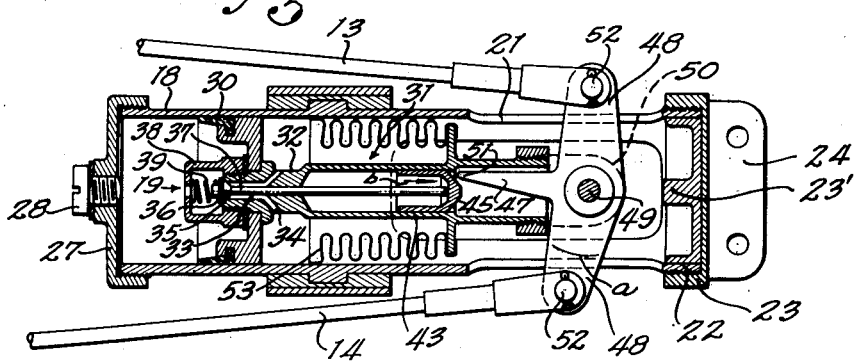
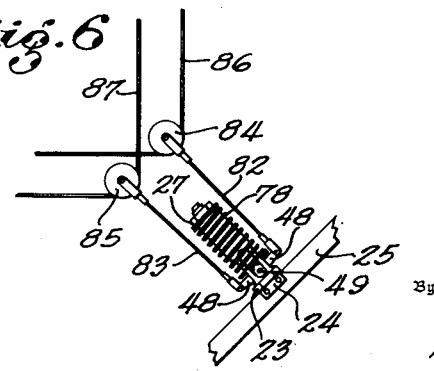
Inventor,
EVERETT B. CUSHMAN
By James M. Abbett
Attorney Patented Aug. 17, 1943

2,327,021

UNITED STATES PATENT OFFICE 2,327,021

CABLE TENSION REGULATOR

Everett B. Cushman, Roscoe, Calif., assignor to Sturgess Inc., Glendale, Calif., a corporation of California Application October 21, 1941, Serial No. 415,941

6 Claims. (Cl. 74—501)

This invention relates to airplane construction and the like, and particularly pertains to a cable tension regulator.

In the construction and operation of airplanes the control of the plane is brought about through the transmission of power by the manipulation of various control cables. These cables are rigged so that elements, such as the rudder and ailerons, may be moved, set and held in position, and so that various parts may be simultaneously moved to alternate positions requiring considerable precision in their operation. Since the performance of airplanes is now expected to include a wide flying range and the movement of the planes from low to high altitudes and vice versa at enormous speeds, it will be evident that varying temperature and weather conditions may prevail which will cause expansion and contraction of the airplane structure upon which the relatively non-stretching cables are rigged. Furthermore, it should be pointed out that when sudden change in the speed of travel of the airplane takes place, such as when making a rapid ascent or in dive bombing, the entire structure of the plane is subjected to tension or compression forces. These forces tend to contract or expand parts of the plane structure and would thus render the nonstretchable cables unduly taut or loose. In any event, this would act to render the controls of the airplane uncertain and might produce a condition in which the airplane would become entirely out of the control and management of the pilot. It is obvious, therefore, that a constant and uniform tension should be maintained in all of the control cables at all times. Heretofore, attempts have been made to achieve this desirable result by the use of springs. Such springs may function properly when the variation in conditions is gradual and during which times the normal load on the cables is approximately 100 pounds. When, however, conditions vary suddenly a violent strain is set up which may reach as much as 1,200 pounds. At such times spring means would collapse entirely since it is not practicably possible to maintain springs having a maximum capacity greater than any maximum strain which might be set up in the plane in an extreme emergency.

It is the principal object of the present invention to provide means acting automatically to regulate the tension on the control cables of an airplane, whereby variation in expansion and contraction of parts of the airplane upon which control cables are mounted, or to which they are connected, will be compensated for during the performance of the airplane.

The present invention contemplates the provision of a cable tension regulator which may be connected to the dead end of a cable or interposed in operative relation to the cable at a point between its ends and by which the effective length of the cables may be varied yieldably during normal performance of an airplane and the cables will be locked around a pivot during violent change, whereby the controls of the airplane may be maintained efficiently effective.

The invention is illustrated by way of example in the accompanying drawings, in which:

Figure 1 is a diagrammatic view in plan illustrating one installation in which the present invention may be used.

Fig. 2 is a view in central section through one form of cable regulating device with which the present invention is concerned.

Fig. 3 is a view in longitudinal central section through the cable tension regulating device as seen on the line 3—3 of Fig. 2.

Fig. 4 is a fragmentary view in section showing the lever arm and valve structure in their locking position.

Fig. 5 is a view in central section showing a simplified form of the invention.

Fig. 6 is a view in diagram showing another installation of the invention and discloses the form of the invention shown in Fig. 5 although the form of the invention shown in Fig. 1 is equally applicable.

Referring more particularly to the drawings, 10 indicates a control lever, here shown as fitted with cable pulleys 11 and 12. Rove around the cable pulleys are cables 13 and 14. The ends of these cables are secured to a cable tensioning device generally indicated at 15. This tensioning device may be one of the types shown in either Fig. 2 or Fig. 4. The cables make a dead-end connection to the tensioning device. The opposite ends of the cables may connect to the free ends of a rudder lever 16 by which a rudder 17 is manipulated. It is understood that while this structure is shown and described in connection with a rudder control, that it is equally applicable to other uses and other controls. The present invention is particularly concerned with the problem of maintaining the cables 13 and 14 under equal tension so that swinging movement of the lever 10 in either direction will cause the lever arm 16 to move in unison therewith without lost motion.

By reference to Figs. 2 and 3 of the drawings it will be seen that the cable regulator comprises a fluid cylinder 18 within which a piston structure 19 is mounted. The cylinder is formed with an extension frame including longitudinally extending arms 20 which are formed from continuations of the cylinder when side openings 21 are cut therein. The arm portions 20 terminate in a cylindrical portion 22 onto which an anchor cap 23 is threaded. The anchor cap 23 is fitted with a bolting flange 24 by which the structure may be fastened to a rigid frame element 25 by bolts 26. The opposite end of the cylinder structure is fitted with a head cap 27 which is threaded onto the cylinder 18 and seals the same. A threaded filling plug 28 is threaded into the end of the cap.

The piston 19 is formed at its lower end with an annular groove 29 which receives a sealing apron ring 30. This ring extends beyond the end of the piston where it is formed in the shape of a tapered skirt. The ring is preferably formed of rubber or other suitable material which will form a tight seal between the cylinder and the piston. Connected centrally of the piston 19 and extending upwardly between the frame elements 20 is a piston rod structure 31. This structure comprises a lower stem member 32 which is threaded into and through the piston 19. A cylindrical by-pass opening 33 extends upwardly into the lower end of the stem portion and is formed at its upper end with by-pass ducts 34. Fluid can thus pass from one side of the piston to the other through said opening and ducts. The outer end of the opening 33 is formed with a tapered valve seat 35. A movable conical valve element 36 of the tappet type is provided to register with said tapered seat under conditions to be hereinafter described. A valve stem 37 is connected to the valve element 36 and extends longitudinally into the piston rod structure. A valve cage 38 is mounted upon the piston rod 32 and carries a valve spring 39 which tends to force the valve element to its seat. The wall of the valve cage is perforate, permitting a free flow of fluid. Extending beyond the stem portion 32 of the piston rod 31 is a tubular extension 40. The end of this extension adjacent the stem is filled with packing material 41 which is held in place by a threaded nut 42. The valve stem 37 projects through a central opening in the packing and the nut. The portion of the tubular length 40 adjacent to the nut 42 forms a cylinder 43 within which a plunger 44 may reciprocate. The plunger 44 has a skirt which fits within the cylinder and is formed with a conical end 45. The end of the valve stem 37 extends into the plunger 44 and rests against the inner end face of the conical end member 45 as held yieldably by the spring 39. The piston rod 31 has an outer tubular extension 46 which receives a finger 47. This finger is mounted on a dual lever arm 48 which is centrally carried on a pivot pin 49. The pivot pin 49 extends through ears 50 formed at the end of the piston rod and supports the lever 48 for pivotal movement in the plane of the longitudinal axis of the piston rod 31. The finger 47 is longitudinally tapered and has a point 51 which normally registers with the apex of the conical end 45 of the plunger 44. The longitudinal center of the finger 47 lies normally along the longitudinal center plane of the piston rod 31 and at right angles to the length of the dual lever 48. Thus, when the lever 48 swings it will move the point 51 of the piston to one side or the other of the apex 45 of the plunger 44 and will permit the plunger to move forwardly within the cylinder 40 as urged by the valve stem 37 and the valve spring 36. The opposite ends of the dual lever 48 carry shackle pins 52 which engage shackles of operating cables 13 and 14. An installation using these operating cables is shown in Fig. 1 of the drawings.

Mounted around the piston rod 31 and within the cylinder 18 is a boot 53. This boot is tubular and cup-shaped. The skirt of the boot is seated against the inner wall of the cylinder 18 and is held by suitable fastening means not shown in the drawings. The upper end of the boot turns inwardly and is secured around the piston rod 31 by suitable fastening means. The boot is preferably made of flexible material and will receive fluid which passes from the cylinder 18 through the valve structure in the piston rod stem portion 32. When the valve 36 is in its open position the fluid which has passed into the boot may return into the cylinder beyond the piston 19. It is intended that the piston 19 shall be drawn toward the head cap 27 when tension is applied to the cables 13 and 14.

The movement of the piston 19 is resisted by the fluid within the cylinder 18 as it is displaced by the piston and by spring means. In the form of the invention shown in Figs. 1 and 2 of the drawings the spring means comprise angularly disposed coil springs 57 and 58. These springs are seated at one end upon spring seats 59 and 60, respectively, which are mounted upon pivot pins 61 and 62. The pivot pins 61 and 62 are carried at the outer ends of lateral arms 63 and 64, which form a part of a collar 65. The collar 65 is split and is held in position around a shoulder 66 on the cylinder 18 by bolts 67. The seats 59 and 60 are formed with tubular guides 68 and 69, respectively. These members extend longitudinally in the helical springs 57 and 58 and receive stems 70 and 71, respectively, of spring seats 72 and 73. The spring seats 72 and 73 have a marginal portion against which the ends of the springs 57 and 58 rest and a conical portion forming sockets to receive the ball ends 74 and 75 of an equalizer bar 76. The bar 76 stands transversely of the longitudinal axis of the piston rod 31 and is threaded onto this rod adjacent to its free end. By this arrangement it will be seen that as the piston 19 and its rod 31 move toward the compression end of the cylinder 18 the springs will be compressed, and at the same time will swing from a position substantially at an angle of 45 degrees to the longitudinal axis of the piston rod to a position approaching a plane at right angles to the longitudinal axis. It will be obvious, therefore, that as the springs are compressed the force parallelogram will change in proportion to the spring compression and the swinging movement of the spring, so that the effective resistance to the movement of the piston will remain substantially the same at all points in its reciprocation.

In the form of the invention shown in Fig. 5 of the drawings a different structure is shown from that previously described, although the function of it is generally the same. In this structure the cylinder 18 is employed, having the piston 19. The piston 19 is connected with the piston rod 31 and its upper extension carries lugs 50 to receive the pivot pin 49. The upper end of the cylinder structure carries the bolting flange 24, which is suitably attached to a mounting member on the airplane. The dual cable lever 48 is mounted upon the pin 49 and is connected by means of shackles to the cables 13 and 14. In the place of the equalizer bar 76 shown in Fig. 2 of the drawings the present structure is fitted with a disc-shaped spring seat 77. The spring seat 77 is threaded onto the tubular portion 46 of the piston rod 31 and receives one end of a helical spring 78 which embraces the cylinder 18 and rests at its opposite end upon an annular flange 79 of the end cap 27. The dual lever 48 is fitted with the valve finger 47, previously described, which rests against the conical end 45 of the tubular extension 46 and functions in the manner previously described in operating the fluid valves. Attention is directed to the fact that the contiguous faces 80 and 81 of the dual lever 48 and the spring seat 77, respectively, are spaced a slight distance from each other so that the cables 13 and 14 may have a limited latitude of adjustment with relation to each other through the lever 48. When, however, a uniform tension strain is applied to the cables 13 and 14 the lever 48 will be drawn longitudinally of the cylinder 18 against the compression of the spring 78.

The invention is shown in Fig. 1 of the drawings as used on a dead-end cable connection. In Fig. 6 of the drawings an adaptation of the invention is disclosed in which two cables are tensioned intermediate their ends by the structure. In this installation the dual lever arm 48 is provided with cables 82 and 83 which carry pulleys 84 and 85, respectively. Cables 86 and 87 are led around these pulleys to have the same effect in maintaining uniform tension on the two cables as that obtained by the structures shown in Figs. 1 and 5 when connected to the dead ends of the cables.

In operation of the present invention the structure of the cable tension regulator is assembled as shown in the forms of the invention in Figs. 2, 3 and 4, or the form of the invention shown in Fig. 5. The device may then be attached to cables 13 and 14 as a dead-end connection, as shown in Fig. 1, or as an intermediate structure as shown in Fig. 6. In either form of the invention it is understood that normal forces acting to increase or diminish the tension on the cables 13 and 14 will be compensated for by the springs. In the form of the invention shown in Fig. 2 these springs are indicated at 57 and 58. In the form of the invention shown in Fig. 5 a single spring 78 is shown. In both structures a hydraulic lock is provided for holding the piston 19 against movement in either direction when an unequal strain is imposed on the cables 13 and 14.

Referring first to the form of the invention shown in detail in Figs. 2, 3 and 4, it will be assumed that the piston 19 normally stands in the position indicated in Figs. 2 and 3, and that under such circumstances the valve element 36 will be held out of engagement with its seat 35 by the finger 47 carried upon the dual lever 48 and resting against the apex 45 of the member 44. It is to be understood that the cables are tightened so that they are under a definite load, since they are opposed to each other in their action, as shown in Fig. 1. This tightening will place the springs 57 and 58 under compression force so that the springs may further compress or expand as the conditions tend to impose greater or lesser strain upon the cables. The structures shown in Figs. 2, 3 and 5 show the lever 48 at its extreme outermost position and limited from further movement by the stop 23' in the end of the cylinder portion 22. In Fig. 4 of the drawings, however, the dual lever 48 is shown as drawn to an intermediate position and then subjected to an unequal strain on the two cables which will cause the lever to swing. This will be more fully described hereinafter. As the tension on the cables 13 and 14 increases uniformly the dual lever 48 will act through the pin 49 to force the piston 19 toward the cylinder head 27 or to permit the piston to move outwardly when the tension on the cables 13 and 14 is uniformly relieved. During such times the finger 47 stands in longitudinal alignment with valve stem 37. It holds this valve stem in its outermost position against the action of spring 39. The valve 36 will thus be held off of its seat 35 so that fluid may by-pass through the ducts 33 and 34 to and from the end of the cylinder 18 and the boot 53, all depending on which way the piston moves. It is to be understood that the boot 53 may be as shown or may be of any other construction, such for example as the general design of a Sylphon bellows.

In the event that unequal tension is imposed upon the cables 13 and 14 due to any cause it will be evident that the dual lever 48 will rock on the pin 49. Let it be assumed that tension on the cable 14 becomes greater than tension on the cable 13, either due to an increased strain on the cable 14 or a relief of tension on cable 13, then the dual lever 48 will swing in the direction of the arrow a, as indicated in Fig. 4, and the finger 47 will swing in a similar direction. This will cause the top of the finger 47 to move out of similar longitudinal alignment with the apex of the cone 45 so that the pressure of the spring 39 will force the cone 45 in the direction of the arrow b, and will thereby release the valve element 36 to cause it to seat on the valve seat 35 and to seal the by-pass duct 33 against the movement of fluid from one side of the piston to the other. It will thus be seen that when unequal strain is imposed upon the cables 13 and 14 movement of the pivot pin 49 and the piston 19 will be stopped and the piston will be locked hydraulically so that no further force can be imposed upon the springs 57 and 58. This will prevent these springs from being subjected to undue strain when excessive forces are set up in the structure of the airplane. It will then be evident that when the piston 19, together with the pivot pin 49, are locked against movement the dual lever 48 will be free to move around the pivot until the strain on cables 13 and 14 is equalized by the action of the lever intending to increase or decrease the effective lengths of the cables so that the forces imposed upon them will be counterbalanced. When the strains set up in the plane have restored the cables 13 and 14 to equal tension the dual lever 48 will move to its original position, as shown in Fig. 3, and the finger 47 will move to a position in central longitudinal alignment with the point of the cone 45, so that the valve 36 will be lifted from its seat and the piston released. When this is accomplished the tension of the cables will be imposed again upon the springs 57 and 58.

By particular reference to Fig. 2 it will be seen that the springs 57 and 58 are disposed obliquely with relation to the central longitudinal axis of the cylinder 18. Thus, as the arm 76 and the piston 19 move the springs will tend to pivot on the pivot pins 61 and 62 and will change their angle with relation to the central axis of the structure so that the springs will move toward a position at right angles to the longitudinal axis of the cylinder as the springs are compressed. This insures that the spring resistance to movement of the piston will be substantially the same at all times.

In the form of the invention shown in Fig. 5 of the drawings the dual spring is eliminated and a spring 18 is provided. This spring acts to cushion the movement of the piston. The hydraulic lock for the piston is the same in this type of device as that previously described.

It will thus be seen that by the use of the structure here disclosed it is possible to maintain two cables in pressure equilibrium at all times, and to insure thereby that regardless of the forces acting to change the tension load on the cables the device will act automatically to compensate for variation in strain on the cables, and to maintain the structure in operative condition without imposing undue strain on the cushioning elements of the structure.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A cable tensioning device, comprising a fixed cylinder having one closed end, a piston slidably mounted within said cylinder and forming a seal for an incompressible fluid filling the space within the cylinder between the piston and the closed end, a piston rod carried by the piston and extending from the open end of said cylinder, a pivot upon said piston rod disposed with its axis at right angles to the longitudinal axis of the rod, a dual arm structure mounted upon said pivot and having a pair of arms which extend oppositely from said pivot, the ends of said arms being connected with separate cables disposed substantially parallel to the longitudinal center of the cylinder, a fluid reservoir, a valved bypass from the cylinder to the fluid reservoir, and means operative when unequal force applied to the dual lever by the cables rocks the same to close the bypass and lock the piston against movement within the cylinder.

2. The structure of claim 1 including spring means yieldably resisting the movement of said piston in the direction of the tension force applied to the cables.

3. In combination with a pair of separate cables adapted to be maintained under equal tension, a cable tensioning structure including a fixed frame, a supporting member carried by said frame and movable in a plane parallel to the direction of tension force applied to the cables, a dual lever pivotally mounted upon said support and having a pair of opposed arms with which said cables engage, whereby force applied to the cable on one arm will be imparted to the cable on the other arm, means yieldably resisting movement of the support in the direction of tension of the cables, said means including a piston and a fluid dash pot, and means acting automatically to lock said support against longitudinal movement when the tension upon the two cables becomes unequal.

4. In combination with a pair of separate cables adapted to be maintained under equal tension, a cable tensioning structure including a fixed frame, a supporting member carried by said frame and movable in a plane parallel to the direction of tension force applied to the cables, a dual lever pivotally mounted upon said support and having a pair of opposed arms with which said cables engage, whereby force applied to the cable on one arm will be imparted to the cable on the other arm, means yieldably resisting movement of the support in the direction of tension of the cables, said means including a piston and a fluid dash pot, and means acting automatically to lock said support against longitudinal movement when the tension upon the two cables becomes unequal, said lock including a valve adapted to close a bypass duct around the piston.

5. A cable tensioning device, comprising a relatively fixed cylinder closed at one end, a piston rod, a piston slidable in said cylinder and attached to one end of said piston rod, a fluid reservoir surrounding said piston rod, a bypass between the cylinder and the reservoir, a valve by which said bypass may be opened and closed, springs yieldably resisting movement of the piston toward the closed end of the cylinder and interposed between the piston and the cylinder, a dual arm structure pivotally mounted upon the opposite end of the piston from the cylinder and having a cable connected to each of said arms, and means between said arms and the bypass valve whereby a condition of unequal tension upon said cables will act to close the bypass valve and temporarily lock the piston against movement.

6. In a device of the character described, a cylinder, a piston reciprocating within said cylinder and carrying an outwardly projecting piston rod, a supporting frame structure rigidly mounted upon the cylinder and lying in a plane transversely thereof, spring seats pivotally mounted upon said frame structure at opposite sides of the longitudinal axis of the cylinder and at right angles to said axis, spring seats carried at the outer end of the piston rod and disposed in a plane offset from that of the first named spring seats and relatively close to the longitudinal axis of the piston, and springs interposed between said seats and disposed at angles to the longitudinal axis of the piston, whereby movement of the piston into the cylinder will tend to swing the springs toward the plane of the frame and thus change the angle of force of the springs.

EVERETT B. CUSHMAN.